UNITED STATES PATENT OFFICE.

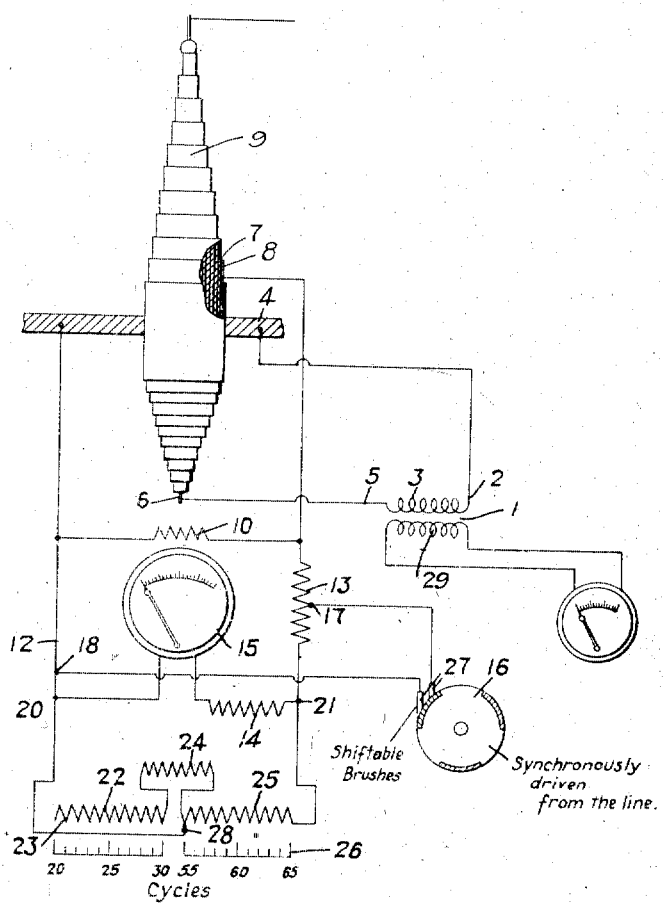

LEWIS W. CHUBB, OF PITTSBURGH, PENNSYLVANIA, ASSIGNOR TO WESTINGHOUSE ELECTRIC AND MANUFACTURING COMPANY, A CORPORATION OF PENNSYLVANIA.

ELECTRICAL MEASURING INSTRUMENT.

1,253,212.  Specification of Letters Patent.  Patented Jan. 15, 1918.

Application filed February 7, 1916. Serial No. 76,605.

*To all whom it may concern:*

Be it known that I, LEWIS W. CHUBB, a citizen of the United States, and a resident of Pittsburgh, in the county of Allegheny and State of Pennsylvania, have invented a new and useful Improvement in Electrical Measuring Instruments, of which the following is a specification.

My invention relates to electrical measuring instruments and particularly to instruments for indicating the crest or maximum values of voltage waves having any frequency.

The object of my invention is to provide means for correcting the indications of a crest voltmeter in accordance with the frequency of the voltage to be measured.

U. S. application, Serial No. 798,529, filed October 31, 1913, by C. L. Fortescue and assigned to the Westinghouse Electric and Manufacturing Company, discloses a method of measuring the maximum or crest value of the voltage impressed on a circuit which consists in measuring the charging current of a condenser that is connected across the circuit. A device of this type will indicate the correct crest or maximum values of the voltage if the capacitance of the condenser and the frequency of the circuit remain constant. However, if the frequency increases, for example, to sixty-one cycles from a normal frequency of sixty cycles, the instrument will indicate a value proportionally higher than the correct value.

In order to cause the instrument to indicate correctly when the frequency changes, I provide a calibrated adjustable resistor any desired portion of which may be connected in shunt relation to the indicating instrument for the purpose of shunting current from the instrument in accordance with the frequency. Of course, the resistor should be adjusted for each change in frequency.

The single figure of the accompanying drawing is a diagrammatic view of apparatus embodying my invention.

One terminal 2 of the primary winding 3 of a transformer 1 is connected to a grounded casing 4, and its other terminal 5 is connected to a terminal conductor 6. The terminal conductor 6 is surrounded by alternate layers of insulating material 7 and tinfoil 8 to constitute a condenser terminal bushing 9 of a definite capacitance. The outer layer 8 of tin-foil is connected through a resistor 10 to the grounded casing 4. A circuit 12 comprising a resistor 13, a resistor 14 and an indicating instrument 15, such as a direct-current ammeter, is connected in shunt relation to the resistor 10, and a contact-making and breaking device 16 is connected between the points 17 and 18 of the circuit 12 for the purpose of short circuiting the instrument 15 during each alternate half-cycle. A calibrated adjustable resistor 22 is provided, any desired portion of which may be connected between the points 20 and 21 of the circuit 12. The resistor 22 is divided into three sections 23, 24 and 25, and is provided with a scale 26 and a movable contact member 28. Any desired portion of the resistor 22 may be connected in shunt relation to the instrument 15 for the purpose of shunting the current therefrom to change its readings when the frequency impressed across the transformer 1 changes from the value for which the instrument 15 is calibrated.

Since the outer conducting layer of the condenser terminal bushing 9 is connected through the resistor 10 to the casing 4 of the transformer, the charging current of the bushing will traverse the resistor, and the average value of this charging current may be determined by measuring the drop across the resistor 10 every alternate half-cycle or by measuring the average value of the rectified current wave through a non-inductive circuit connected in shunt relation to the resistor 10. The value of the average charging current, disregarding its sign, is proportional to the capacitance of the condenser, the frequency of the voltage wave and the maximum or crest value of the voltage. Hence, if a direct-current ammeter, the deflections of which are proportional to the average value of the charging current, is used, it will indicate values proportional to the crest voltage and the frequency.

The contact-making and breaking device 16 is adapted to operate at such speed that the ammeter 15 is short circuited during every alternate half-cycle, the brushes 27 being so arranged that they may be shifted to change the time of short circuiting to the zero points of the current wave.

If the frequency is constant and the capacitance of the condenser terminal bushing 9 is known, the maximum or crest value of the voltage of the transformer 1 may be determined by operating the contact-making and breaking device 16 and noting the reading of the ammeter 15. Of course, it is understood that the ammeter 15 is calibrated to indicate the maximum value of the voltage wave or the root-mean-square value of a sine wave having the same maximum value. That is to say, the value marked on any part of the scale is directly proportional to the current traversing the winding of the ammeter 15 and inversely proportional to the capacitance of the condenser and the frequency of the voltage to be measured.

Since the scale of the ammeter 15 may be calibrated to correspond to any capacitance or frequency, it is desirable to utilize the same scale when the frequency changes, and, in order to permit the use of a single scale, irrespective of the frequency of the voltage to be measured, I provide the adjustable resistor 22 a selected portion of which I connect in shunt relation to the ammeter 15 for shunting current therefrom in accordance with the change in frequency. That is to say, the movable contact member 28 of the resistor 22 is set at a point to correspond to the reading of a frequency-meter 11 that is connected to the secondary winding 29 of the transformer 1. When the contact member 28 is set in the correct position, sufficient current will be shunted from the ammeter 15 to cause it to indicate correctly.

Assuming that the ammeter 15 is calibrated to read correctly when the frequency is sixty cycles and my device is not used, if the frequency should increase to sixty-one cycles, the ammeter 15 would read substantially 1.66 per cent. higher than its correct value. However, if my device is used, and if the contact member 28 is moved to a position corresponding to sixty-one cycles, the amount of resistance connected in shunt to the ammeter will be decreased to such an extent that substantially 1.66 per cent. less current will traverse the ammeter to cause it to indicate correctly.

The resistor 10 may be omitted if it is desired to permit all of the charging current of the condenser to traverse the winding of the instrument 15.

Changes may be made in the method of connecting the condenser, the means for rectifying the current and the means for shunting the current from the ammeter without departing from the spirit and scope of my invention as set forth in the appended claims.

I claim as my invention:

1. A device for indicating the maximum value only of the voltage of an electric circuit comprising an indicating instrument, means for supplying an actuating force to the indicating instrument that is dependent in value upon the frequency and the value of the voltage to be measured, and means for neutralizing the effect of a change in frequency upon the indicating instrument.

2. A voltage-measuring device comprising a condenser adapted to be supplied with current proportional to the frequency and the voltage to be measured, a measuring instrument for indicating the value of the current traversing the condenser and means for adjusting the instrument to indicate voltage independently of changes in the frequency.

3. A voltage-measuring device comprising a condenser adapted to be supplied with current proportional to the frequency and the voltage to be measured, a measuring instrument for indicating the value of the current traversing the condenser and a calibrated resistor any desired portion of which may be connected in parallel relation to the instrument for adjusting it to indicate voltage independently of changes in the frequency.

4. A device for indicating the voltage of an electric circuit comprising a condenser connected across the circuit, indicating means for determining the value of the charging current of the condenser and means for so shunting current from the said indicating means that it will indicate the voltage independently of change in frequency of the circuit.

5. A measuring device for an electric circuit comprising a condenser connected across the circuit, means for indicating the charging current of the condenser and means for so shunting current from the said means that its indications are independent of changes in the frequency of the circuit.

6. A device for indicating the maximum value of the voltage of an electric circuit comprising an indicating instrument, means for supplying current to the instrument that is dependent in value upon the frequency and the maximum value of the voltage, and an adjustable resistor any desired portion of which may be connected in shunt relation to the instrument for adjusting its readings in accordance with changes in frequency.

7. A measuring device for an electric circuit comprising a condenser connected across the circuit, means for indicating the charging current of the condenser and an adjustable resistor for so shunting current from the said means that its indications are independent of changes in the frequency of the circuit.

In testimony whereof, I have hereunto subscribed my name this 28th day of Jan. 1916.

LEWIS W. CHUBB.